(12) United States Patent
Yang et al.

(10) Patent No.: US 11,926,491 B2
(45) Date of Patent: Mar. 12, 2024

(54) EMBLEM INSTALLATION SYSTEM AND METHOD

(71) Applicant: GM GLOBAL TECHNOLOGY OPERATIONS LLC, Detroit, MI (US)

(72) Inventors: Wuhua Yang, Superior Township, MI (US); Roberto E. Hirayama, Sao Paulo (BR); Terebara A. Hughes, Redford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 570 days.

(21) Appl. No.: 17/149,144

(22) Filed: Jan. 14, 2021

(65) Prior Publication Data

US 2022/0219917 A1    Jul. 14, 2022

(51) Int. Cl.
*B25J 15/00* (2006.01)
*B25J 5/02* (2006.01)
*B25J 9/14* (2006.01)
*B25J 9/16* (2006.01)
*B25J 13/08* (2006.01)
*B25J 15/06* (2006.01)
(Continued)

(52) U.S. Cl.
CPC ............. *B65G 47/918* (2013.01); *B25J 5/02* (2013.01); *B25J 9/144* (2013.01); *B25J 9/1633* (2013.01); *B25J 9/1679* (2013.01); *B25J 13/082* (2013.01); *B25J 15/0052* (2013.01); *B25J 15/0066* (2013.01); *B25J 15/0616* (2013.01);
(Continued)

(58) Field of Classification Search
CPC ............. B25J 15/0616; B25J 15/0625; B25J 15/0641; B25J 15/0691; B25J 15/0052; B25J 15/0066
See application file for complete search history.

(56) References Cited

U.S. PATENT DOCUMENTS 9,452,616 B1    9/2016  Mathis et al.
10,479,061 B2 *  11/2019 Kameda ............... B25J 15/0052
(Continued)

FOREIGN PATENT DOCUMENTS

CN    201454790 U    5/2010
CN    201505616 U    6/2010
(Continued)

OTHER PUBLICATIONS

English machine translation of CN-112171700-A (Year: 2021).*

*Primary Examiner* — Scott W Dodds
(74) *Attorney, Agent, or Firm* — Quinn IP Law

(57) ABSTRACT

An emblem installation system for installing emblems on a work piece includes an end effector for a robotic arm. The end effector has a base and multiple vacuum gripper modules repositionable along the base in different configurations. The vacuum gripper modules are configured to simultaneously grip multiple emblems and individually release the emblems. An emblem installation method includes applying a force within a first range of forces to the multiple emblems individually and in succession via vacuum gripper modules of an end effector on a robotic arm, with the emblems disposed at a first location, applying a vacuum to the vacuum gripper modules to grip the emblems with the vacuum gripper modules, and moving the robotic arm from the first location to a second location adjacent a workpiece with the emblems gripped by the vacuum gripper modules.

14 Claims, 9 Drawing Sheets

(51) Int. Cl.
   *B62D 65/16* (2006.01)
   *B65G 47/91* (2006.01)
(52) U.S. Cl.
   CPC .......... *B25J 15/0691* (2013.01); *B62D 65/16* (2013.01); *B65G 47/917* (2013.01)

(56) References Cited

U.S. PATENT DOCUMENTS

| | | | |
|---|---|---|---|
| 2015/0130201 A1* | 5/2015 | Crosby | B65G 47/918 294/81.1 |
| 2018/0009000 A1 | 1/2018 | Shang et al. | |
| 2019/0291998 A1* | 9/2019 | Richards | B65H 3/0816 |
| 2019/0299414 A1* | 10/2019 | Kato | B65C 9/30 |
| 2020/0223634 A1 | 7/2020 | Arase et al. | |
| 2020/0262069 A1* | 8/2020 | Douglas | B65G 47/918 |
| 2020/0361091 A1* | 11/2020 | Diankov | B25J 9/1687 |
| 2022/0088799 A1 | 3/2022 | Gao | |

FOREIGN PATENT DOCUMENTS

| | | | | |
|---|---|---|---|---|
| CN | 103909743 A | | 7/2014 | |
| CN | 205614668 U | | 10/2016 | |
| CN | 205668274 U | | 11/2016 | |
| CN | 207709728 U | | 8/2018 | |
| CN | 208100876 U | | 11/2018 | |
| CN | 109229540 A | | 1/2019 | |
| CN | 208932493 U | | 6/2019 | |
| CN | 110329710 A | | 10/2019 | |
| CN | 210138794 U | | 3/2020 | |
| CN | 112171700 A | * | 1/2021 | .......... B25J 15/0019 |
| DE | 19927105 A1 | | 12/2000 | |
| DE | 10013224 A1 | | 9/2001 | |
| DE | 10230034 A1 | | 1/2004 | |
| DE | 10339067 A1 | | 3/2005 | |
| DE | 102018120496 A1 | | 2/2020 | |
| EP | 0005376 A1 | | 11/1979 | |

* cited by examiner

EMBLEM INSTALLATION SYSTEM AND METHOD

INTRODUCTION

The present disclosure generally relates to an emblem installation system and an emblem installation method such as for installing vehicle emblems.

Some bodies, such as vehicle bodies, may have multiple adhesive emblems of different sizes, shapes, thicknesses, and contours secured thereto. Typically, installation of such emblems involves multiple steps such as peeling off a tape liner from the adhesive side, placing the emblem on the body, applying pressure with a wet-out roller to wet-out the adhesive, and then peeling away any disposable foam carrier and/or surface liner. The process may be performed manually or robotically. When performed manually, the same size roller is used to wet-out the various size emblems. When performed robotically, a dedicated end effector for a robotic arm may be necessary for picking up and placing each particular emblem on the vehicle, and multiple additional end effectors with different size rollers may be necessary in order to ensure wet-out of the various emblems. In addition to the expense and the space requirements of these multiple tools needed to carry out emblem installation, production time may also be increased due to tool changes that may be needed between the picking and placing and wet-out modes for the same or different emblems. If the process is carried out manually, it is difficult to ensure that desired picking, placement, and wet-out pressures and correct positioning of the emblem on the body are achieved, as these could largely depend upon the operator's perceived manual pressure and visual accuracy. In some instances, a locking mechanism is incorporated into the roller hardware design to ensure a targeted wet-out force is applied, leading to a uniform force applied to all emblems regardless of the compliant material properties of the emblems.

SUMMARY

The present disclosure generally relates to an emblem installation system and an emblem installation method. Example implementations include automotive assembly processes, such as installation of emblems on vehicle body panels, and nonautomotive assembly processes. A reconfigurable end effector may be used to reduce cycle time, as it is able to pick up multiple emblems from one location (e.g., from a support) and be moved by a robotic arm for placement of the emblems at different predetermined locations on a work piece (e.g., on a vehicle body), thus achieving multiple installation operations at the second location without returning to the first location (the pick-up location) for each emblem separately and without requiring two different robotic arms and end effectors to accomplish the installation operation simultaneously. Additionally, the end effector may be reconfigured to pick up many differently sized and shaped emblems, avoiding the necessity of having a dedicated end effector for each different emblem. Furthermore, the reconfigurable end effector may be adapted for a hybrid of robotic arm path and application force control according to a force control algorithm for emblem picking, placement, and wet-out.

An emblem installation system for installing emblems on a work piece includes an end effector for a robotic arm. The end effector has a base and multiple vacuum gripper modules repositionable along the base in different configurations. The multiple vacuum gripper modules are configured to simultaneously grip multiple emblems and individually release the multiple emblems. For example, the multiple vacuum gripper modules may selectively receive vacuum both individually and collectively.

In an embodiment, the emblem installation may include an emblem support platform having multiple through holes and configured to support the multiple emblems. The multiple vacuum gripper modules may extend directly over at least some of the multiple through holes when gripping the multiple emblems to pick the multiple emblems up off of the emblem support platform. In contrast to a solid pick-up surface (e.g., a surface without sufficiently sized through holes), the through holes of the emblem support platform prevent the multiple vacuum gripper modules from becoming accidentally stuck due to the vacuum suction because air can be pulled through the through holes.

In an implementation, the base may include a track, and the multiple vacuum gripper modules may be repositionable in the different configurations along the track, such as by sliding the multiple vacuum gripper modules to positions along the track, and locking the multiple vacuum gripper modules in those positions.

In an aspect, each of the multiple vacuum gripper modules may include a compliant body configured to resiliently compress to conform to one of the multiple emblems. A compressive stiffness, a thickness, or both a compressive stiffness and a thickness of the compliant body of at least one of the multiple vacuum gripper modules may be different than a compressive stiffness, a thickness, or both a compressive stiffness and a thickness of the compliant body of at least one other of the multiple vacuum gripper modules. Accordingly, the multiple vacuum gripper modules may be somewhat customized in this manner to the contours (e.g., the profile variation), the shape, and compliant material properties of the emblems, such as relative stiffnesses of different portions of an emblem.

In addition to the multiple vacuum gripper modules, the end effector may further include a wet-out roller, a first arm extending from the base to at least one of the multiple vacuum gripper modules, and a second arm extending from the base to the wet-out roller. In some implementations, a first pneumatic cylinder may be connected to the first arm, and a second pneumatic cylinder may be connected to the second arm. The emblem installation system may include a pneumatic power source selectively connected to the first pneumatic cylinder and to the second pneumatic cylinder to extend and retract the first arm and the second arm separately from one another. In this manner, only the first arm is extended in a picking mode when the multiple vacuum gripper modules grip the multiple emblems and only the second telescoping arm is extended in a wet-out mode to wet-out the multiple emblems at the different predetermined locations on the work piece. The longitudinal axis of the first telescoping arm may be parallel with a longitudinal axis of the second telescoping arm. In such a configuration, extension of the first and second arms is generally in the same direction, and retraction of the first and second arms is likewise in the same direction, which is opposite to the extension direction, simplifying the path algorithm for the robotic arm.

In other embodiments, the end effector further includes a wet-out roller, a first arm extending from the base to at least one of the multiple vacuum gripper modules, and a second arm extending from the base to the wet-out roller, but a longitudinal axis of the first arm is nonparallel with a longitudinal axis of the second arm. In such an embodiment, the robotic arm may rotate the end effector about an axis perpendicular to the longitudinal axes of both arms to move from an emblem placement mode to a wet-out mode.

Still further, the reconfigurable, multiple vacuum gripper modules of the end effector enables more localized control of forces on the emblem during pick-up and placement, in addition to force control during wet-out. For example, one or more force sensors may be operatively connected to the multiple vacuum gripper modules and the wet-out roller and operable to indicate an application force of each of the multiple vacuum gripper modules and of the wet-out roller. Additionally, an electronic controller may be in communication with the one or more force sensors and configured to execute a set of stored instructions to apply a force within a first range of forces just prior to or while applying a vacuum to grip the multiple emblems with the multiple vacuum gripper modules, a force within a second range of forces to place the multiple emblems at different locations on the work piece, and a force within a third range of forces to apply the wet-out roller to the multiple emblems on the work piece. These different force ranges may be optimal for the different functions of each mode (picking, placing, and wet-out) of emblem installation.

An emblem installation method according to the present disclosure includes applying a force within a first range of forces to the multiple emblems individually and in succession via multiple vacuum gripper modules of an end effector on a robotic arm, with the multiple emblems disposed at a first location (e.g., at the support platform). The method may include monitoring, via an electronic controller, a magnitude of the force applied by the multiple vacuum gripper modules while applying the force within the first range of forces (e.g., to enable adjustment of the application force, if necessary, in order to maintain the force applied by the multiple vacuum gripper modules during the emblem pick-up mode within the first range of forces). The emblem installation method further includes applying a vacuum to the multiple vacuum gripper modules to grip the multiple emblems with the multiple vacuum gripper modules, and moving the robotic arm from the first location to a second location adjacent a workpiece with the multiple emblems gripped by the multiple vacuum gripper modules to transfer the multiple emblems from the first location to the second location. The method includes applying a force within a second range of forces to the multiple emblems individually and in succession via the multiple vacuum gripper modules while releasing the vacuum to the multiple vacuum gripper modules individually and in succession to place the multiple emblems at different predetermined locations on a work piece. This placement of the multiple emblems at the second location is accomplished without the robotic arm returning to the first location (due to the ability of the end effector to carry multiple emblems at once from the first location to the second location). The method includes monitoring, via the electronic controller, a magnitude of the force applied by the multiple vacuum gripper modules while applying the force within the second range of forces (e.g., to enable adjustment of the application force, if necessary, in order to maintain the force applied by the multiple vacuum gripper modules during the emblem placement mode within the second range of forces).

In some implementations, the method may include applying a force within a third range of forces to the multiple emblems via a wet-out roller of the end effector to wet-out the multiple emblems on the work piece after placing the multiple emblems at the different predetermined locations on the work piece, and monitoring, via the electronic controller, a magnitude of the force applied by the wet-out roller while applying the force within the third range of forces (e.g., to enable adjustment of the application force, if necessary, in order to maintain the force applied by the wet-out roller during the emblem wet-out mode within the third range of forces).

In some implementations, the work piece may be moving while the end effector is applying the force within the second range of forces and the force within the third range of forces (e.g., during the placement mode and the wet-out mode). To account for this movement, the method may include tracking movement of the work piece, and moving the robotic arm in response to the movement of the work piece while applying the force within the second range of forces and the force within the third range of forces.

In a configuration, the end effector includes a first arm supporting at least one of the multiple vacuum gripper modules, a second arm supporting the wet-out roller, with a longitudinal axis of the first arm parallel with a longitudinal axis of the second arm. The emblem installation method may further include extending the first arm prior to applying the force within the first range of forces, and retracting the first arm and extending the second arm prior to applying the force within the third range of forces via the wet-out roller. The wet-out roller is thus out of the way, and will not interfere with the emblems during pick-up and placement, and the multiple vacuum gripper modules are out of the way and will not interfere with the emblems during the wet-out mode.

In another configuration, the end effector includes a first arm supporting at least one of the multiple vacuum gripper modules, a second arm supporting the wet-out roller, with a longitudinal axis of the first arm nonparallel with a longitudinal axis of the second arm. In such a configuration, the emblem installation method may further include pivoting the robotic arm about an axis perpendicular to both of the longitudinal axis of the first arm and the longitudinal axis of second arm after applying the force within the second range of forces via the at least one of the multiple vacuum gripper modules and before applying the force within the third range of forces via the wet-out roller. The wet-out roller is thus out of the way, and will not interfere with the emblems during pick-up and placement, and the multiple vacuum gripper modules are out of the way and will not interfere with the emblems during the wet-out mode.

In some implementations, the multiple emblems may be supported on an emblem support platform having multiple through holes during the emblem pick-up mode. In such an implementation, the emblem installation method may include applying a vacuum to the multiple vacuum gripper modules to pull air through the through holes after applying the first range of forces to the multiple emblems via the multiple vacuum gripper modules to pick up the multiple emblems off of the emblem support platform.

In some implementations, the end effector has a base with a track, and the emblem installation method further includes positioning the multiple vacuum gripper modules in a configuration (e.g., a first configuration) corresponding to a dimension of a first emblem and a dimension of a second emblem such that a first subset of the multiple vacuum gripper modules applies the force within the first range of forces and the force within the second range of forces to the first emblem and not to the second emblem, and a second subset of the multiple vacuum gripper modules applies the force within the first range of forces and the force within the second range of forces to the second emblem and not to the first emblem. In the first configuration, the multiple vacuum gripper modules are configured to pick up a first set of multiple emblems. The emblem installation method may further include positioning the multiple vacuum gripper modules in a second configuration corresponding to a dimension of a third emblem and a dimension of a fourth emblem (e.g., a second set of emblems), the dimension of at least one of the third emblem or the fourth emblem being different than the dimension of the first emblem or the dimension of the second emblem, the second configuration different than the first configuration, such that a third subset of the multiple vacuum gripper modules applies the force within the first range of forces and the force within the second range of forces to the third emblem and not to the fourth emblem, and a fourth subset of the multiple vacuum gripper modules applies the force within the first range of forces and the force within the second range of forces to the fourth emblem and not to the third emblem, and either the third subset is different than the first subset or the fourth subset is different than the second subset or both the third subset is different than the first subset and the fourth subset is different than the second subset.

Within the scope of the disclosure, an emblem installation system for installing emblems on a work piece may include an end effector for a robotic arm, the end effector having a base and multiple vacuum gripper modules extending from the base. The emblem installation system may further include an emblem support platform having multiple through holes and configured to support the multiple emblems. The multiple vacuum gripper modules may extend directly over at least some of the multiple through holes to pull air through the through holes when gripping the multiple emblems to pick the multiple emblems up off of the emblem support platform.

The above features and advantages and other features and advantages of the present disclosure are readily apparent from the following detailed description of the best modes for carrying out the disclosure when taken in connection with the accompanying drawings.

DETAILED DESCRIPTION

Figure 1:
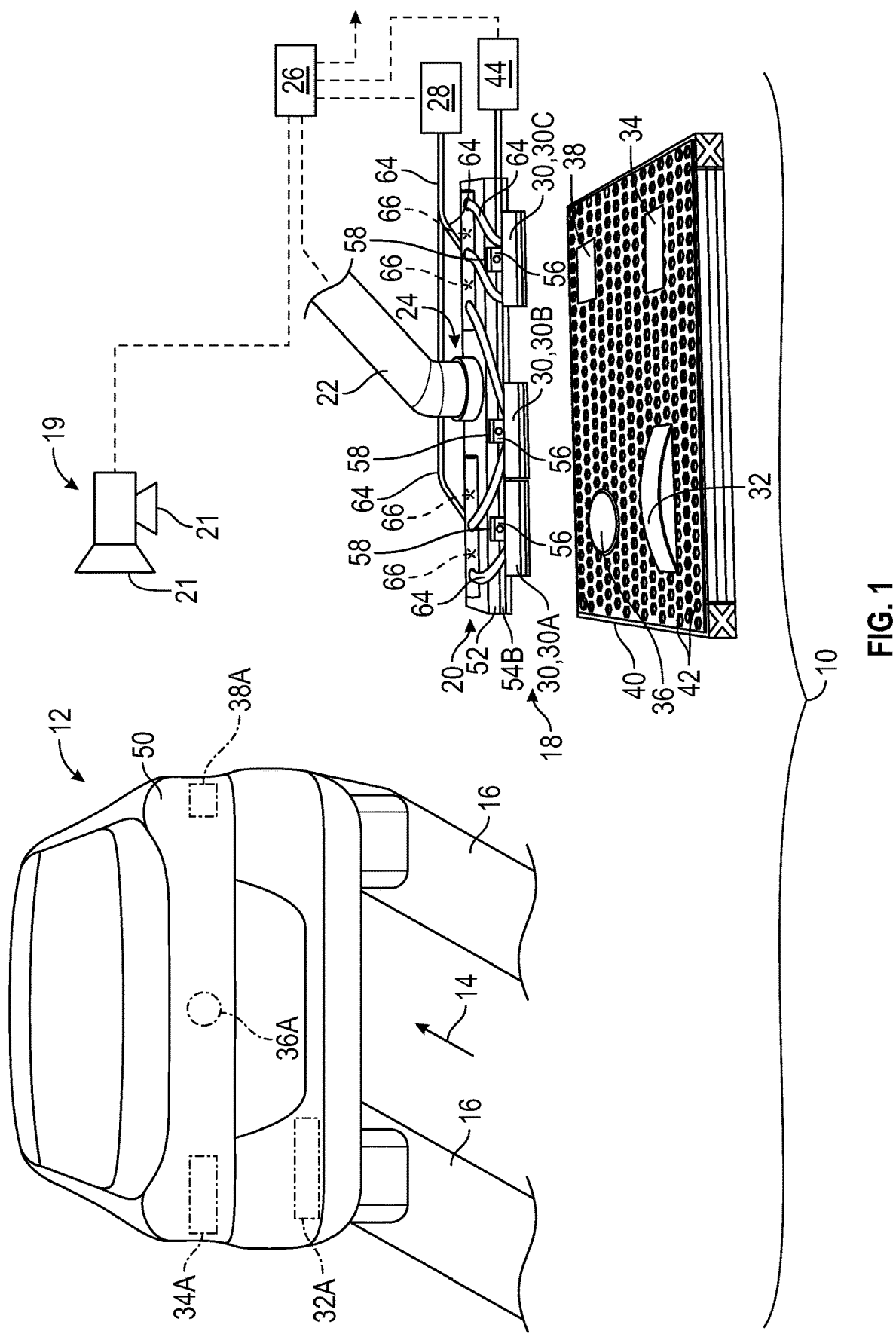
FIG. 1 is a fragmentary illustration of a work space showing an emblem installation system and a vehicle on which emblems are to be installed.

Referring to the drawings, wherein like reference numbers refer to like components, FIG. 1 shows a work space 10 for vehicle assembly, including a work piece 12, such as a vehicle 12, moving in the direction of arrow 14, such as along automated tracks 16 or otherwise, during an emblem installation process. A first embodiment of an emblem installation system 18 is shown that enables efficient and accurate installation of multiple emblems of different sizes and shapes as discussed herein. Although the work piece is a vehicle 12 in the embodiment shown, the emblem installation system 18 may be used to install emblems on other types of work pieces, such as appliances or furniture. Additionally, although the vehicle 12 is represented as an automotive vehicle, the vehicle may be any movable device for transporting people or materials on land, in air, in water, or through space. Examples of vehicles include automobiles, trucks, motorcycles, carts, wagons, trains, aircraft, missiles, ships, boats, submarines, and spaceships.

The emblem installation system 18 includes an end effector 20 shown attached to a robotic arm 22 via a coupling 24 that includes electrical connectors for providing power, control signal, and sensor signal communication between the end effector 20 and an electronic controller 26. The electronic controller 26 includes a memory, a processor, and a set of stored instructions executed by the processor to carry out an emblem installation method 400 disclosed herein.

The electronic controller 26 is also operatively connected to a vacuum source 28 and controls a vacuum applied by the vacuum source 28 to multiple vacuum gripper modules 30 included on the end effector 20 so that the vacuum gripper modules 30 (individually labelled as 30A, 30B, and 30C) can selectively receive vacuum individually, in any combination, or collectively to simultaneously grip two or more of the multiple emblems 32, 34, 36, and 38 and individually release the multiple emblems as discussed further herein. Although only three vacuum gripper modules 30A, 30B, and 30C and four emblems 32, 34, 36, and 36 are shown, instead of three vacuum gripper modules 30, the end effector 20 may have only two or may have more than three vacuum gripper modules 30, and instead of four emblems 32, 34, 36, and 38 there may be only two or more than four emblems of different sizes and shapes supported on a platform 40 to be installed on the vehicle 12.

The emblems 32, 34, 36, and 38 are shown supported on an emblem support platform 40 that has multiple through holes 42 and is configured to support the multiple emblems. As shown, the emblems 32, 34, 36, and 38 overlie some of the through holes 42. Additionally, the electronic controller 26 is operatively connected to a pneumatic power source 44 (e.g., an air compressor) that may actuate pneumatic cylinders that extend and retract different ones of the multiple vacuum gripper modules 30 and may also actuate a wet-out roller that may further be included on the end effector 20 as discussed herein to accomplish the emblem installation process. The reconfigurable end effector 20 reduces cycle time as it is able to pick up multiple emblems from a first location (e.g., from the support platform 40) and be moved by the robotic arm 22 to a second location (e.g., adjacent the vehicle 12) for placement of the emblems at different predetermined locations 32A, 34A, 36A, and 38A on a work piece (e.g., on the body 50 of the vehicle 12) achieving multiple installation operations without moving back and forth between the first location and the second location to pick up and move each emblem separately to the second location. The predetermined locations 32A, 34A, 36A, and 38A are shown at the rear of the vehicle, such as on a decklid or liftgate. However, the predetermined locations could instead be anywhere on the vehicle 12 at which emblems are to be installed, such as on a side door panel, such as a front door panel.

Figure 2:
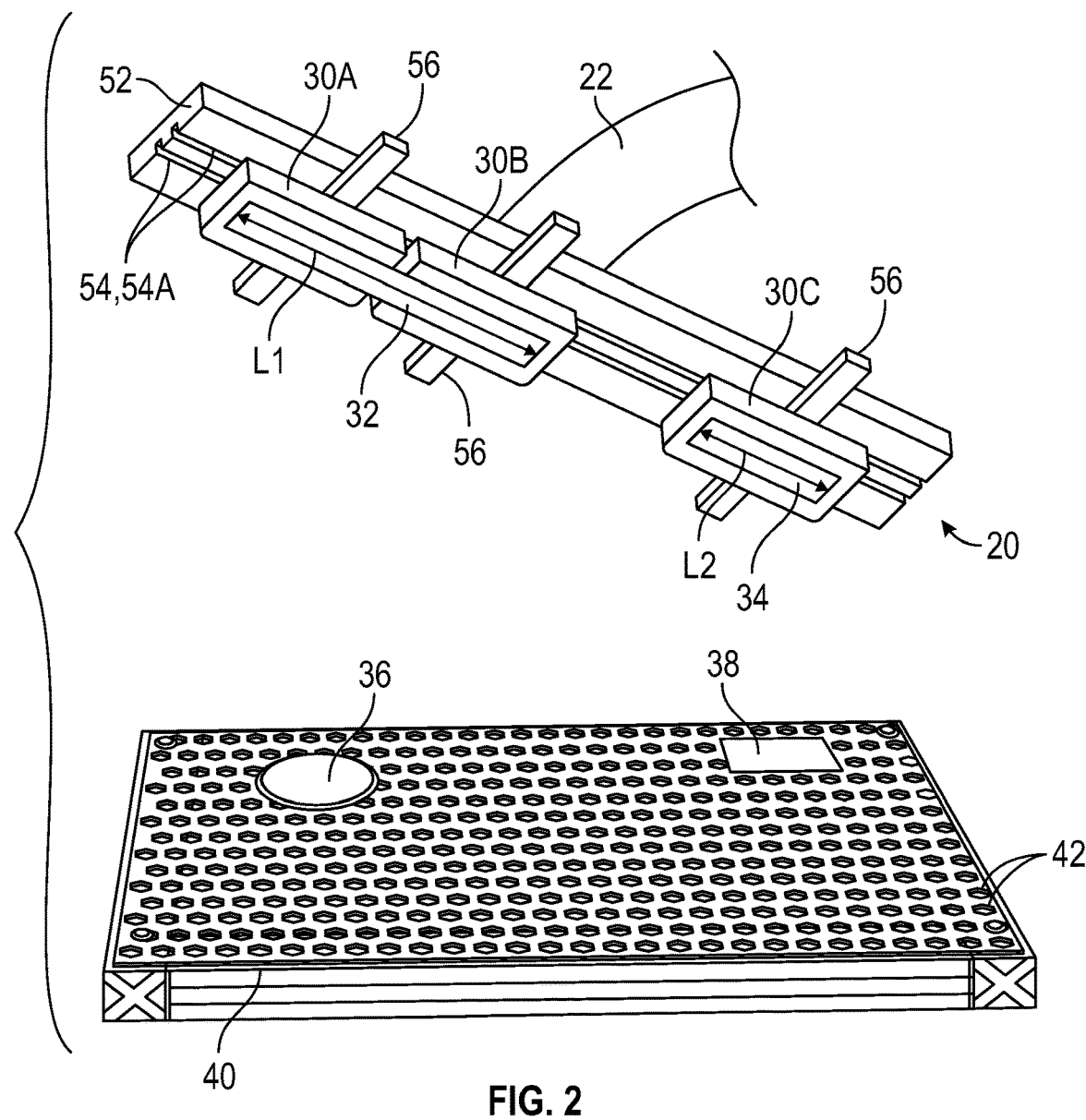
FIG. 2 is a fragmentary illustration of the emblem installation system of FIG. 1 showing a robotic arm and an end effector with multiple vacuum gripper modules in a first configuration picking up and gripping first and second emblems and showing an emblem support platform supporting emblems.
Figure 4:
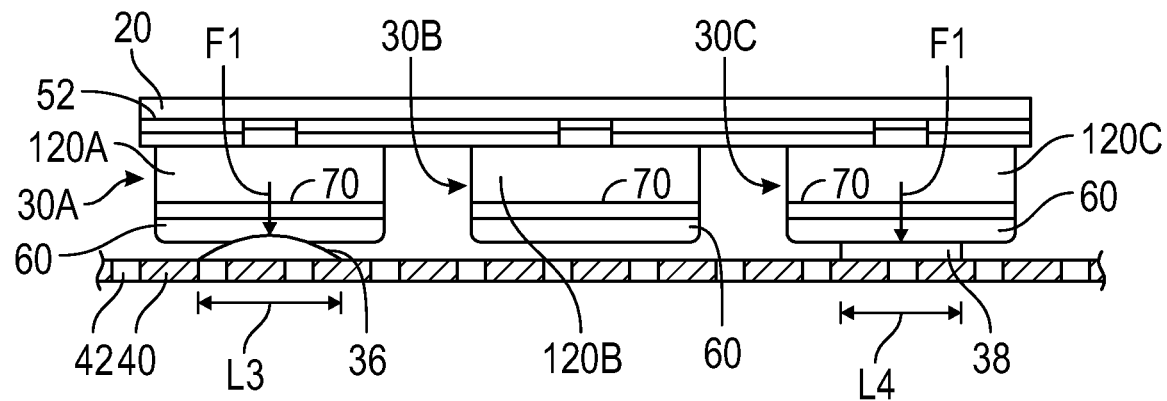
FIG. 4 is a fragmentary side view of the end effector of FIG. 2 with the multiple vacuum gripper modules in a second configuration in the process of picking up different emblems supported on the emblem support platform shown in cross-sectional view.

The emblem installation system 18 also includes a vision system 19, and the electronic controller 26 is connected to the vision system 19. The vision system 19 includes one or more cameras 21 adapted to indicate the size and shape of the emblems, the position of the emblems, and the position of the vehicle 12. In the embodiment discussed herein, for purposes of illustration of the reconfigurability of the end effector 20, the end effector 20 picks up first and second emblems 32, 34 simultaneously when in a first configuration (as shown in FIG. 2) and is then reconfigured to a second configuration (as shown in FIG. 4) to pick up third and fourth emblems 36 and 38 separately after the first and second emblems 32, 34 are installed on the vehicle body 50. Alternatively, the end effector 20 could be configured with enough vacuum gripper modules 30 to pick up all of the emblems 32, 34, 36 and 38 at once.

With continued reference to FIGS. 1 and 2, the end effector 20 has a base 52 and the multiple vacuum gripper modules 30A, 30B, and 30C are repositionable along the base 52 in different configurations (e.g., different relative spacings of the vacuum gripper modules 30A, 30B, and 30C from one another). The base 52 includes a track 54 shown with both a lower linear path 54A (see FIG. 2) and a side linear path 54B (see FIG. 1). Another side linear path may extend along the base on the side opposite from the side linear path 54B. Each vacuum gripper module 30A, 30B, 30C extends from a cross bar 56 that is connected via one or more brackets 58 to slide along the track 54 in the paths 54A, 54B. A respective wet-out roller may extend adjacent to each of the vacuum gripper modules 30A, 30B, 30C, such as on the cross bars 56, and pneumatic cylinders may allow separate extension and retraction of the vacuum gripper modules and the wet-out roller, as in the embodiment of FIGS. 14-16. Wet-out roller 31 is further shown and described in the embodiments of FIGS. 11-16.

The multiple vacuum gripper modules 30A, 30B, 30C sufficiently directly overlie the multiple emblems 32, 34 and the platform 40, including at least some of the through holes 42, in the first configuration so that the emblems may be picked up individually and gripped by vacuum force to move from the platform 40 to the vehicle 12 simultaneously. The brackets 58 may be locked in position along the track 54 in the first configuration while carrying out the emblem installation method on the first and second emblems 32 and 34, and then unlocked, slid along the track 54, and locked in the second configuration of FIG. 4 to carry out the emblem installation method 400 on the third and fourth emblems 36 and 38, for example.

As shown in FIG. 2, in the first configuration, vacuum gripper modules 30A and 30B are moved closer to one another, with a large space between vacuum gripper modules 30B and 30C. The grouped together vacuum gripper modules 30A and 30B (referred to as a first set of vacuum modules) together pick up the relatively large first emblem 32 while the single vacuum gripper module 30C (referred to as a second set of vacuum modules) picks up the relatively small emblem 34. The first and second emblems 32, 34 may be referred to as a first set of emblems.

Figure 3:
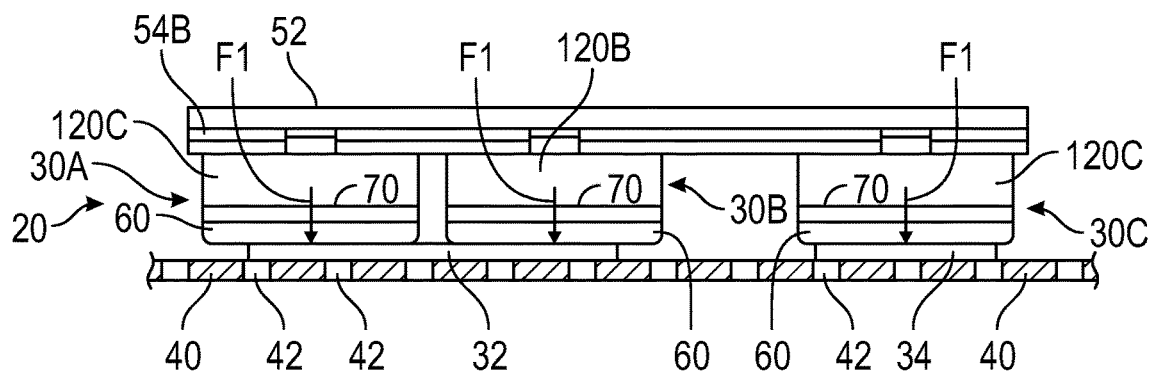
FIG. 3 is a fragmentary side view of the end effector of FIG. 2 in the process of picking up emblems supported on an emblem support platform shown in cross-sectional view.
Figure 5:
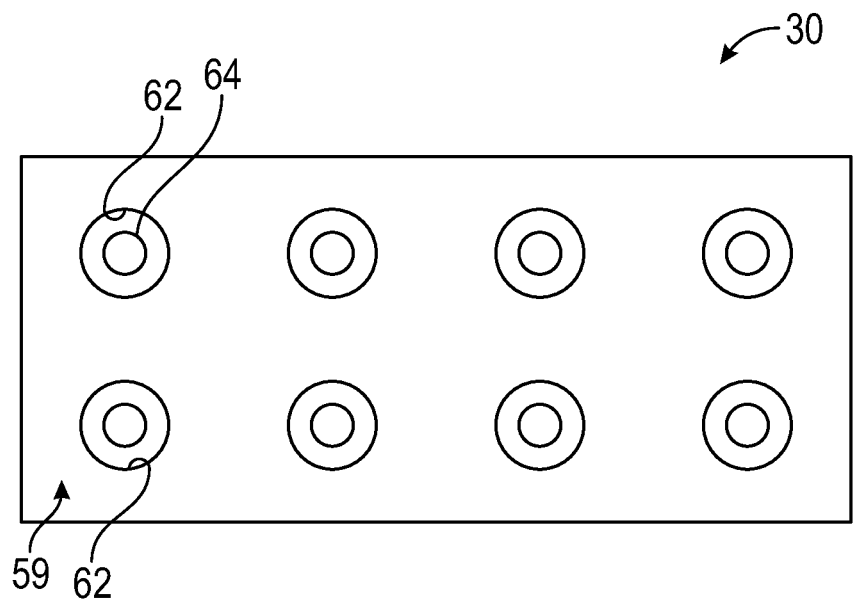
FIG. 5 is a bottom view of one of the vacuum gripper modules of FIG. 1.
Figure 6:
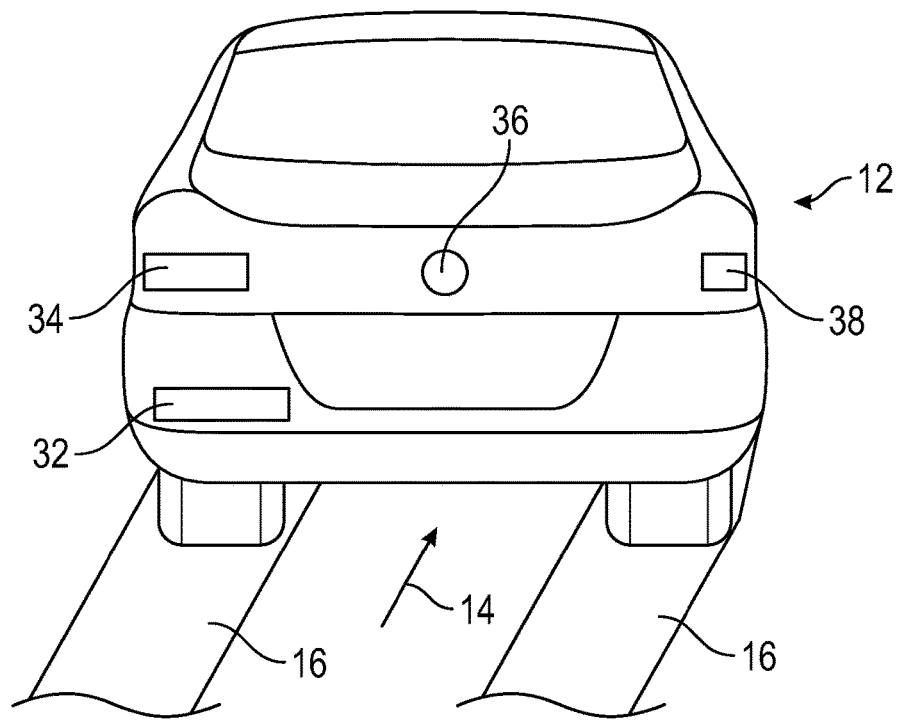
FIG. 6 is a rear view of the vehicle of FIG. 1 with the emblems installed.

As shown in FIG. 3, the vacuum gripper modules 30A, 30B, and 30C extend directly over at least some of the multiple through holes 42 while controlled by the electronic controller 26 to apply a force F1 within a first range of forces on the emblems 32, 34 against the platform 40, and then apply a vacuum to pull air through the through holes 42 when gripping the multiple emblems 32, 34 to pick the multiple emblems 32, 34 up off of the emblem support platform 40. The first range of forces may be, for example, 2 to 5 Newtons, and is sufficient to contact the emblems 32, 34 and allow the subsequent vacuum to maintain the emblems 32, 34 on the vacuum gripper modules 30A, 30B, and 30C while moving the robotic arm 22 from the first location (the platform 40) to the second location (the vehicle 12). The first range of forces may be tailored to the specific emblem design. For example, a more compliant emblem may be able to withstand greater force during pick-up without damage to the surface of the emblem. In contrast to a solid support surface (e.g., a surface without sufficiently sized through holes), the through holes 42 of the emblem support platform 40 prevent the multiple vacuum gripper modules 30A. 30B, 30C from becoming accidentally stuck due to the vacuum suction. Referring to FIG. 5, a bottom view of one of the vacuum gripper modules 30 shows that it has a bottom surface 59 to which multiple apertures 62 extend through the vacuum gripper module 30 to a vacuum conduit 64. The vacuum conduit 64 is shown in FIG. 1 with many branches extending from the vacuum source 28. Multiple switches 66 (some of which are indicated with hidden lines in FIG. 1) may be disposed within the conduit 64 and controlled via the electronic controller 26 to selectively apply and discontinue vacuum to the vacuum gripper modules 30A, 30B, and 30C individually or collectively as needed to carry out the emblem installation method 400.

In the first configuration shown in FIGS. 2 and 3, the grouped together modules 30A and 30B correspond to a dimension of the first emblem 32 (e.g., a length L1 of the first emblem 32) while the single vacuum gripper module 30C corresponds to a dimension of a second emblem 34 (e.g., a length L2 of the second emblem 34). Stated differently, the vacuum gripper modules 30A, 30B, and 30C are positioned so that the grouped together modules 30A, 30B can pick up the entire length of the emblem 32 while still having at least some portion of the vacuum gripper modules 30A, 30B directly overlie the through holes 42 during the vacuum pick-up from the support platform 40. Similarly, module 30C can pick up the entire length of the emblem 34 while still having at least some portion of the vacuum gripper module 30C directly overlie the through holes 42 during the vacuum pick up from the support platform 40. The first subset of the multiple vacuum gripper modules 30A, 30B applies the force within the first range of forces and the force within the second range of forces to the first emblem 32 and not to the second emblem 34, and the second subset of the multiple vacuum gripper modules 30C applies the force within the first range of forces and the force within the second range of forces to the second emblem 34 and not to the first emblem 32.

In FIG. 4, the end effector 20 is reconfigured by positioning the vacuum gripper modules 30A, 30B, and 30C in a second configuration different than the first configuration to pick up the third and fourth emblems 36, 38, referred to as a second set of emblems. In the second configuration, the single vacuum gripper module 30A is a third subset of the vacuum gripper modules 30A, 30B, and 30C and corresponds to a dimension of the third emblem 36 (e.g., a length L3 of the third emblem 36) while the single vacuum gripper module 30C is a fourth subset of the vacuum gripper modules 30A, 30B, and 30C and corresponds to a dimension of a fourth emblem 38 (e.g., a length L4 of the fourth emblem 38), as shown in FIG. 4. The dimension of at least one of the third emblem 36 or the fourth emblem 38 is different than the dimension of the first emblem 32 or the dimension of the second emblem 34. The vacuum gripper module 30A can pick up the entire length of the emblem 36 while still having at least some of the vacuum gripper module 30A directly overlie the through holes 42 during the vacuum pick-up from the support platform 40, and the vacuum gripper module 30C can pick up the entire length of the emblem 38 while still having at least some of the vacuum gripper module 30C directly overlie the through holes 42 during the vacuum pick-up from the support platform 40, such that the third subset (e.g., module 30A in the embodiment shown) of the multiple vacuum gripper modules applies the force F1 within the first range of forces (during pick-up mode) and the force within the second range of forces (during placement mode) to the third emblem 36 and not to the fourth emblem 38, and the fourth subset (e.g., vacuum gripper module 30C in the embodiment shown) of the multiple vacuum gripper modules applies the force F1 within the first range of forces (during pick-up mode) and the force within the second range of forces (during placement mode) to the fourth emblem 38 and not to the third emblem 36. Depending on the specific emblems used, either the third subset is different than the first subset (as shown) or the fourth subset is different than the second subset (in the embodiment shown, the second subset and the fourth subset are the same) or both the third subset is different than the first subset and the fourth subset is different than the second subset.

Figure 7:
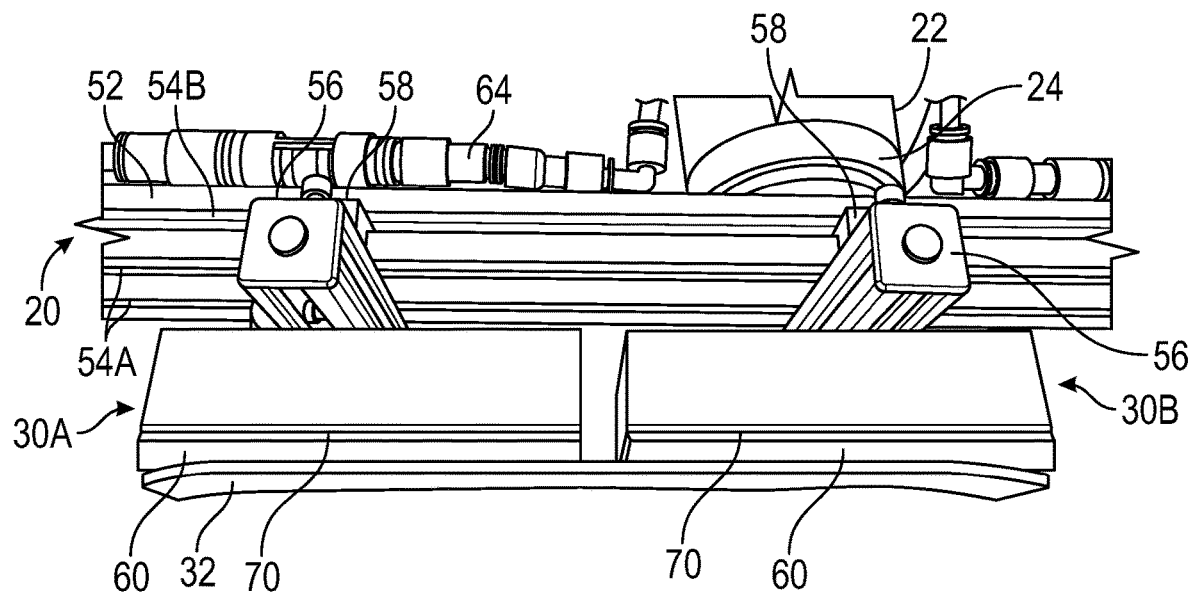
FIG. 7 is a perspective fragmentary view the emblem installation system of FIG. 1 showing two vacuum gripper modules gripping an emblem.
Figure 8:
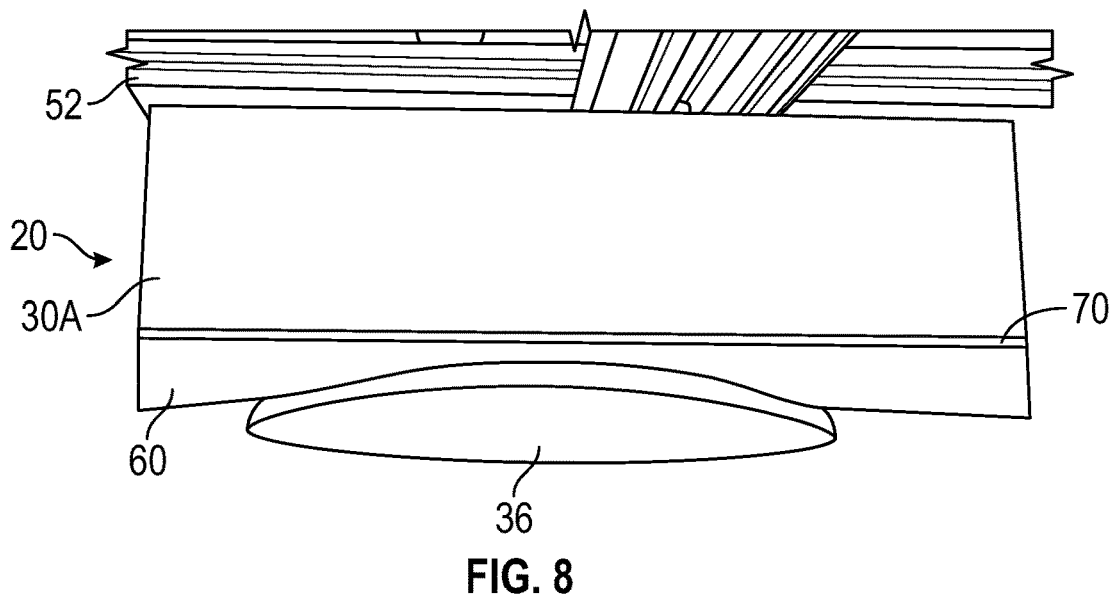
FIG. 8 is a perspective fragmentary view of the emblem installation system of FIG. 1 showing a vacuum gripper module gripping an emblem.

FIG. 7 is a perspective fragmentary view showing vacuum gripper modules 30A, 30B gripping the first emblem 32 when in the first configuration. FIG. 8 is a perspective fragmentary showing the vacuum gripper module 30A gripping the third emblem 36 when in the second configuration. Each of the multiple vacuum gripper modules 30A, 30B, and 30C includes a compliant body 60 configured to resiliently compress to conform to the multiple emblems 32, 34, 36 or 38. For example, the vacuum gripper module 30A compresses to conform to part of the first emblem 32 in the first configuration of FIG. 7, and to the third emblem 36 in the second configuration of FIG. 8. In the example shown, the third emblem 36 has a greater surface contour (e.g., surface profile) and is also a harder material (e.g., a different compliant material property) than the first emblem 32. Additionally, forces within the first range of forces applied during pick up of the first emblem 32 may be less than those applied during pick up of the third emblem 36 (e.g., the first range of forces for pick-up of the first emblem 32 may be different than the first range of forces for pick-up of the third emblem 36).

The stored instructions on the electronic controller 26 may be tuned to the different surface contours and hardnesses of the various emblems to apply different ranges of forces during each of the modes (pick-up and placement) by the vacuum gripper modules 30A, 30B, 30C and wet out by the wet-out roller(s) 31. When more than one vacuum gripper module is applied to the same emblem (such as vacuum gripper modules 30A, 30B applied to emblem 32 in the first configuration), the different vacuum gripper modules may apply different ranges of forces than one another even in the same operational mode (e.g., during pick up) if the different vacuum gripper portions of the emblem that the respective vacuum gripper modules contact have different contour or compliance characteristics.

Figure 9:
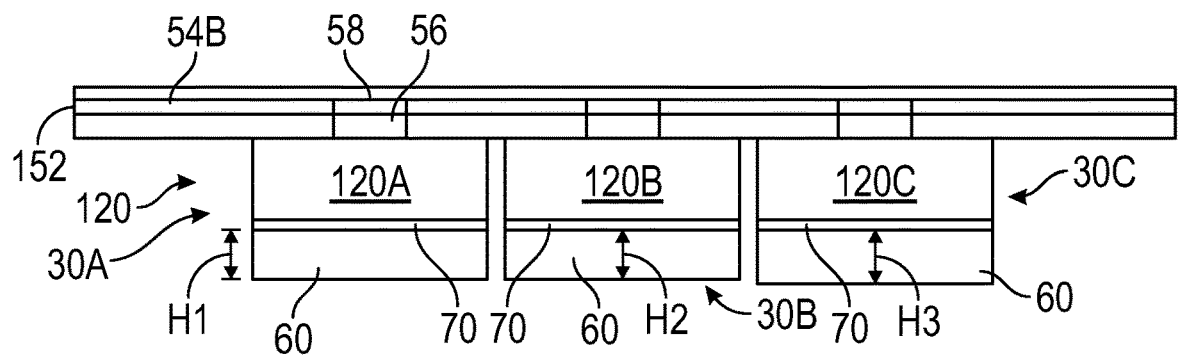
FIG. 9 is a side view of another embodiment of an end effector for the emblem installation system of FIG. 1.
Figure 10:
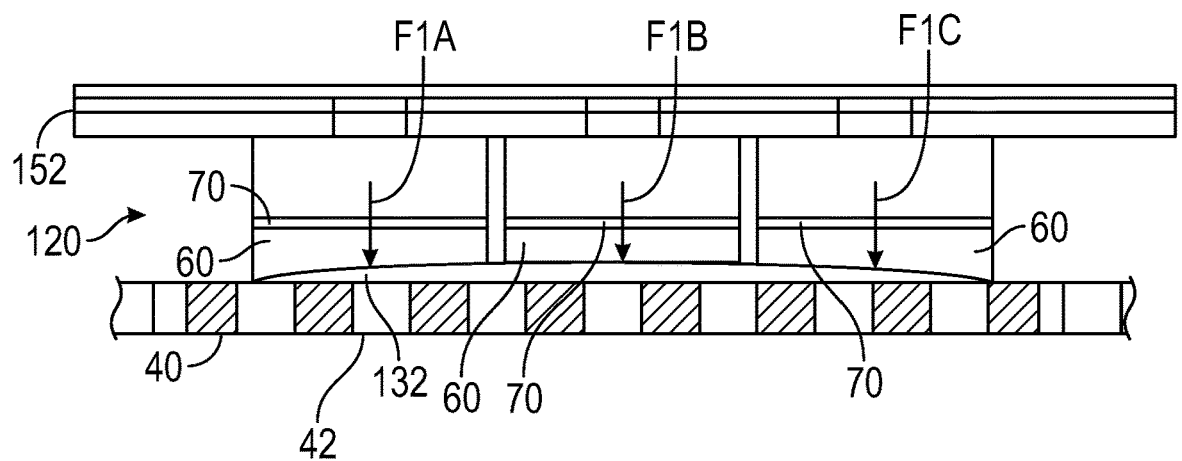
FIG. 10 is a side view of the end effector of FIG. 9 showing multiple vacuum gripper modules in the process of picking up an emblem from the emblem support platform shown in cross-sectional view.

In some embodiments, a compressive stiffness, a thickness, or both a compressive stiffness and a thickness of the compliant body 60 of at least one of the multiple vacuum gripper modules 30A, 30B, and 30C may be different than a compressive stiffness, a thickness, or both a compressive stiffness and a thickness of the compliant body 60 of at least one other of the multiple vacuum gripper modules 30A, 30B, and 30C. For example, FIGS. 9 and 10 are side views of another embodiment of an end effector 120 for the emblem installation system of FIG. 1. The end effector 120 is like end effector 20 except that the compressive stiffnesses of the compliant bodies 60 of the vacuum gripper modules 30A, 30B, and 30C are different as they are specifically tuned to the surface profile of the emblem 132. For example, the compliant body 60 of the vacuum gripper module 30B is less stiff (e.g., has a lower compressive stiffness K2) than the compliant body 60 of the vacuum gripper modules 30A and 30C (e.g., than the compressive stiffness K1 of vacuum gripper module 30A and the compressive stiffness K3 of vacuum gripper module 30C) so that the compliant body 60 of the vacuum gripper module 30B readily compresses to conform to the outer surface of the emblem 132 at its greater height near the middle of the emblem 132. As shown, the compliant bodies 60 compress from respective first heights H1, H2, and H3 in FIG. 9 to lesser heights in FIG. 10 under forces F1A, F1B, and F1C applied by each of the vacuum gripper modules 30A, 30B, and 30C during the pick-up mode. The forces F1A, F1B, and F1C may be the same or different. In some embodiments, any of the initial heights H1, H2 and H3 may also be different from one another instead of or in addition to the compliant bodies 60 having different compressive stiffnesses to conform to the emblems. Similarly, the compressive stiffness of the material of the wet-out roller used, such as wet-out roller 31 in FIGS. 11-16 may be selected at least in part based on the contour (profile variation), shape, and relative stiffnesses (compliant material properties) of different portions of an emblem. Accordingly, the multiple vacuum gripper modules and the wet-out roller(s) may be somewhat customized in this manner to the contour (profile variation), shape, and relative stiffnesses (compliant material properties) of different portions of an emblem.

Additionally, the reconfigurable end effector is adaptable for a hybrid of robotic arm path (position control) and application force planning according to a force control algorithm for emblem picking, placement, and wet-out. For example, to assist in tuning the range of forces for each of the modes of the emblem installation method 400, one or more force sensors 70 are operatively connected to the multiple vacuum gripper modules 30A, 30B, and 30C and to the wet-out roller(s) 31, allowing for real-time adaptive force control. In FIGS. 3-4 and 9-10, the force sensors 70 are shown disposed adjacent to each compliant body 60, such as near the end of a harder arm portion 120A, 120B, and 120C of the vacuum gripper modules 30A, 30B, and 30C. In other embodiments, the force sensors 70 may be located nearer to the base 52 or 152.

The electronic controller 26 is in communication with the one or more force sensors 70 and configured to execute a set of stored instructions to apply a force within a first range of forces to grip the multiple emblems 32, 34, 36 and 38 with the multiple vacuum gripper modules 30A-30C. For example, the force sensors 70 may be a force sensor resistor, a piezoelectric sensor, or a strain gauge load cell. Predetermined force ranges may be optimal for each of the modes of the emblem installation method. For example, during the pick-up mode, a first range of forces from about 2 Newtons to about 5 Newtons may be optimal to ensure that the emblems are not damaged during pick-up from the first location (the platform 40) and transfer to the second location (the vehicle 12). Once the emblems 32, 34 (or 36, 38) are gripped by the vacuum gripper modules 30A, 30B, and 30C, the electronic controller 26 moves the robotic arm 22 toward the vehicle 12. Based upon sensor signals from the force sensors 70, the electronic controller 26 monitors the magnitude of the force applied by the multiple vacuum gripper modules while applying the force within the first range of forces and adjusts the force based on the sensor signals, if necessary, to maintain the force within the first range of forces. Pneumatic cylinders (like cylinder 380 or 382) in FIG. 14) or other linear actuating mechanism may be used to apply force via the vacuum gripper modules 30A, 30B, and 30C.

When the robotic arm 22 moves the end effector 20 to the vehicle 12 to accomplish the placement mode (e. g. placing the emblems against the surface of the vehicle 12 at the predetermined locations 32A, 34A, 36A, and 38A), a second range of forces, such as from about 10 Newtons to about 15 Newtons may be optimal to ensure the emblems are held in place prior to the wet-out mode. Finally, in the wet-out mode, a third range of forces such as from about 37 Newtons to about 39 Newtons may be applied by wet-out roller(s) 31 used to sufficiently wet-out the adhesive of the emblems 32, 34, 36, and 38 without damage to the emblem or the vehicle body 50.

The vehicle 12 may be moving with the automated tracks 16 while the robotic arm 22 moves toward it and during the placement and wet-out modes of the emblem installation process (e.g., while the vacuum gripper modules 30A, 30B, and 30C apply the force within the second range of forces (placement mode) and while the wet-out roller(s) 31 apply the force within the third range of forces (wet-out mode). Accordingly, using the vision system 19, the electronic controller 26 may track movement of the vehicle 12 and move the robotic arm 22 in response to the movement of the vehicle 12 (e.g., accounting for the movement of the vehicle 12) while applying the force within the second range of forces and the force within the third range of forces so that there is a desired relative movement of the end effector 20 and the vehicle 12 during the placement mode, and there is the desired relative movement of the wet-out rollers 31 over the respective emblems 32, 34 or 36, 39 during the wet-out mode.

During the placement mode, the force within the second range of forces is applied by the respective vacuum gripper modules 30A, 30B, and 30C to place the multiple emblems 32, 34, 36 and 38 at different predetermined locations 32A, 34A, 36A, and 38A on the vehicle body 50, moving the robotic arm 22 from the platform 40 to adjacent to the vehicle 12 (with the modules 30A, 30B, 30C facing the vehicle body 50) and with the multiple emblems 32 and 34 (or, on a second trip, emblems 36 and 38) gripped by the multiple vacuum gripper modules to transfer the multiple emblems 32 and 34 from the platform 40 to the vehicle body 50. The electronic controller 26 sends control signals to the end effector 20 to apply a force within the second range of forces to each of the multiple emblems 32, 34 individually and in succession via the multiple vacuum gripper modules 30A, 30B, and 30C while releasing the vacuum to the multiple vacuum gripper modules 30A, 30B, and 30C individually and in succession to place the multiple emblems 32, 34 at the different predetermined locations 32A, 34A on the vehicle body 50 without returning to the first location. For example, the vacuum force applied by the vacuum gripper modules 30A, 30B is released once the emblem 32 is placed at predetermined location 32A and a force within the second range of forces is applied to the emblem 32. During this time, the vacuum is maintained at the vacuum gripper module 30C to maintain a grip on the emblem 34. Alternatively, the electronic controller 26 could be programmed to perform placement of all of both emblems 32 and 34, or all of the emblems 32, 34, 36 and 38 before performing any wet-out functions. Next, the wet-out of the adhesive of the first emblem 32 may be accomplished by moving the robotic arm 22 so that a wet-out roller 31 rolls on the outer surface of the emblem 32 with a force within the third range of forces. The robotic arm 22 then moves the end effector 20 directly from the predetermined location 32A to the predetermined location 34A to place the vacuum gripper module 30C with emblem 34 at the predetermined location 34A, and the vacuum is released from the vacuum gripper module 30C while a force within the second range of forces is applied to place the emblem 34 at the predetermined location 34A. During placement of the emblems 32, 34, the electronic controller 26 monitors the magnitude of the force applied by the vacuum gripper modules 30A, 30B, and 30C, respectively, and adjusts the force as necessary to maintain it within the second range of forces.

The electronic controller 26 moves the robotic arm 22 back to the platform 40, applies a force within the first range of forces to the emblem 36 using the vacuum gripper module 30A, and applies a vacuum to the vacuum gripper module 30A to pick up the third emblem 36. The robotic arm 22 is then moved so that the vacuum gripper module 30C is over the fourth emblem 38, applies a force within the first range of forces to the emblem 38 using the vacuum gripper module 30C, and applies a vacuum to the vacuum gripper module 30C to pick up the fourth emblem 38. During this time, the vacuum is maintained at the vacuum gripper module 30A. Because the vacuum gripper module 30B is not needed for gripping either of the emblems 36, 38, vacuum need not be applied to the vacuum gripper module 30B.

The electronic controller 26 then moves the robotic arm 22 from the platform 40 to the adjacent vehicle 12 with the multiple emblems 36 and 38 gripped by the vacuum gripper modules 30A, 30C, respectively, to transfer the multiple emblems 36 and 38 from the platform 40 to the vehicle body 50. The electronic controller 26 sends control signals to the end effector 20 to apply a force within the second range of forces to each of the multiple emblems 36, 38 individually and in succession via the multiple vacuum gripper modules 30A and 30C while releasing the vacuum to the multiple vacuum gripper modules 30A and 30C individually and in succession to place the multiple emblems 36, 38 at the different predetermined locations 36A, 38A on the vehicle body 50 without returning to the first location. For example, the vacuum applied by the vacuum gripper module 30A is released once the emblem 36 is placed at location 36A and a force within the second range of forces is applied to the emblem 36 via the vacuum gripper module 30C. During this time, the vacuum is maintained at the vacuum gripper module 30C to maintain the grip on the emblem 38. Next, the wet-out of the adhesive of the third emblem 36 may be accomplished by moving the robotic arm 22 so that a wet-out roller rolls on the outer surface of the emblem 36 with a force within the third range of forces. Alternatively, the electronic controller 26 could be programmed to perform placement of the fourth emblem 38 before performing wet-out of the third emblem 36. Otherwise, after wet-out of the third emblem 36, the robotic arm 22 moves the end effector 20 directly from the predetermined location 36A to the predetermined location 38A to place the vacuum gripper module 30C with emblem 38 at the predetermined location 38A, and the vacuum is then released from the vacuum gripper module 30C while a force within the second range of forces is applied to place the fourth emblem 38 at the predetermined location 38A. During placement of the emblems 36, 38, the electronic controller 26 monitors the magnitude of the force applied by the vacuum gripper modules 30A and 30C, respectively, and adjust the force as necessary to maintain it within the second range of forces.

Figure 11:
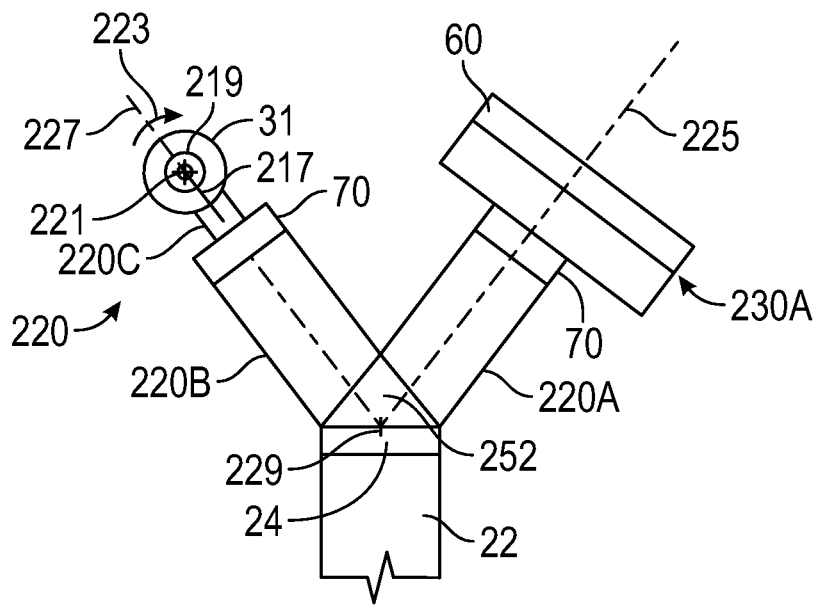
FIG. 11 is a side view of another embodiment of an end effector for the emblem installation system of FIG. 1 mounted on the robotic arm shown in fragmentary view.

FIG. 11 is a side view of another embodiment of an end effector 220 for the emblem installation system 18 of FIG. 1 mounted on the robotic arm 22 shown in fragmentary view. The end effector 220 includes a first arm 220A extending from a base 252 and supporting a vacuum gripper module 230A like vacuum gripper module 30A. The same arm 220A or different arms (not shown) may support addition vacuum gripper modules, further along the base 252 (e.g., further into the page in FIG. 11). The vacuum gripper module 230A may include a compliant body 60 and a force sensor 70 as discussed with respect to the end effector 120. The end effector 220 also includes a second arm 220B extending from the base 252 and supporting the wet-out roller 31. Another force sensor 70 is operatively connected with the wet-out roller 31. Side extensions 217 (one shown) may extend from a terminal end portion 220C of the arm 220B at either end of the wet-out roller 31 and may support a center bar 219 of the wet-out roller 31 so that the wet-out roller 31 rotates about a center axis 221 in the direction of arrow 223 when the wet-out roller 31 is placed in contact with an emblem and the robotic arm 22 is controlled to push the wet-out roller 31 over the outer surface of the emblem.

The force sensors 70 enable the electronic controller 26 to maintain the vacuum gripper module 230A within the first range of forces during the emblem pick-up mode, within the second range of forces during the emblem placement mode.

The force sensor 70 allows the electronic controller 26 to maintain forces applied by the wet-out roller 31 within the third range of forces during the emblem wet-out mode. A longitudinal axis 225 of the first arm 220A is non parallel with a longitudinal axis 227 of the second arm 220B. Accordingly, after placement of an emblem 32, 34, 36 and 38, at one of the respective predetermined locations 32A, 34A, 36A, or 38A, the electronic controller 26 controls the robotic arm 22 to pivot the end effector 220 about an axis 229 that is perpendicular to both of the longitudinal axis 225 of the first arm 220A and the longitudinal axis 227 of second arm 220B before applying the force within the third range of forces via the wet-out roller 31.

Figure 12:
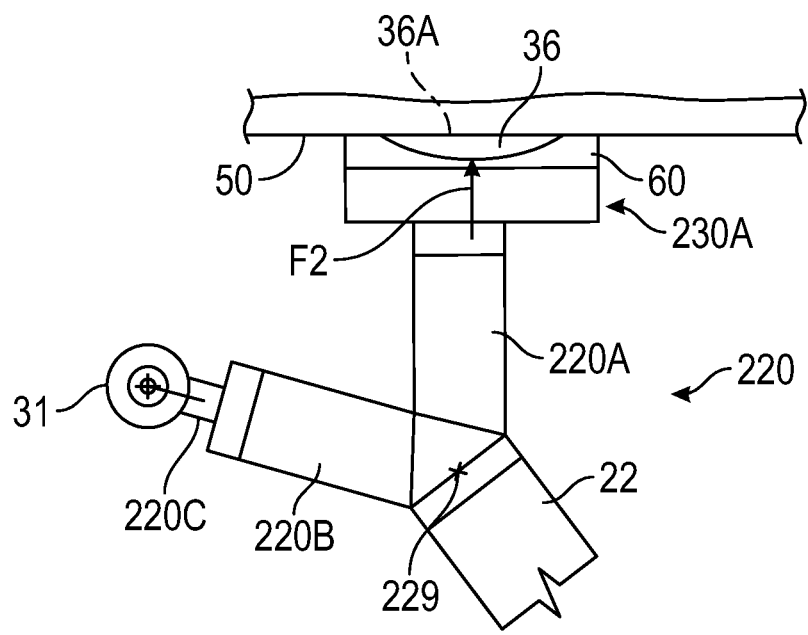
FIG. 12 is a side view of the end effector of FIG. 11 with the robotic arm rotated in a first orientation for pick-up and placement of an emblem by one or more vacuum gripper modules of the end effector.
Figure 13:
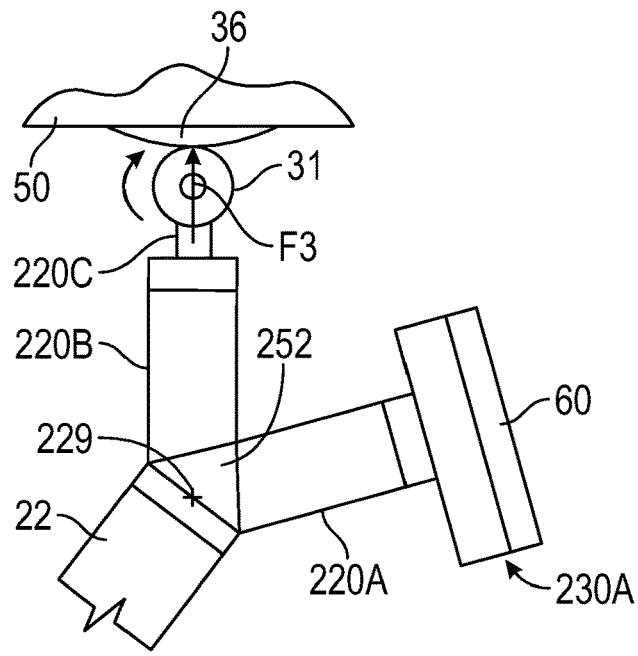
FIG. 13 is a side view of the end effector of FIG. 11 with the robotic arm rotated in a second orientation for wet-out of an emblem by a wet-out roller of the end effector.

FIG. 12 is a side view of the end effector of FIG. 11 with the robotic arm 22 rotated in a first orientation for pick-up and placement of an emblem by one or more vacuum gripper modules (such as vacuum gripper module 230A). The robotic arm 22 is shown controlling the vacuum gripper module 230A to apply a force within the first range of forces to place the emblem 36 on the body 50. In FIG. 13, the robotic arm 22 is shown after rotation about the axis 229 relative to the placement mode of FIG. 12 so that the wet-out roller 31 can be applied with a force within the third range of forces to wet-out the emblem 36 on the body 50.

Figure 14:
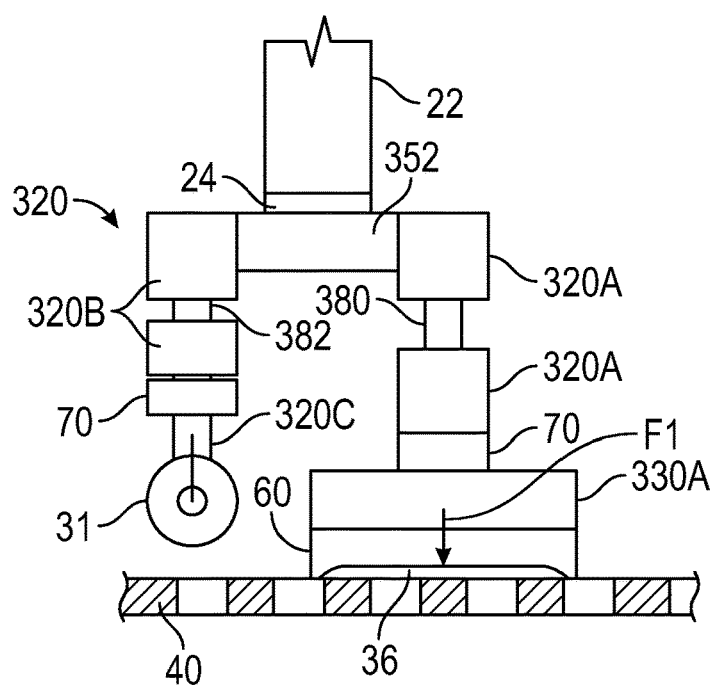
FIG. 14 is a side view of another embodiment of an end effector for the emblem installation system of FIG. 1 mounted on the robotic arm shown in fragmentary view and showing a vacuum gripper module extended for pick-up of an emblem from an emblem support platform shown in cross-sectional view, and showing a wet-out roller retracted.

FIG. 14 is a side view of another embodiment of an end effector 320 for the emblem installation system 18 of FIG. 1 mounted on the robotic arm 22 shown in fragmentary view and showing a vacuum gripper module 330A extended for picking up the emblem 36 from a first location on the emblem support platform 40. The end effector 320 includes a first arm 320A extending from a base 352 and supporting the vacuum gripper module 30A. The same or different arms (not shown) may support additional vacuum gripper modules, further along the base 352 (e.g., further into the page in FIG. 14). The vacuum gripper module 330A may include a compliant body 60 and a force sensor 70 as discussed with respect to module 230A. A second arm 320B extends from the base 352 and the wet out roller 31 extends from a terminal end portion 320C of the second arm 320B. Another force sensor 70 is operatively connected with the wet-out roller 31. Additional wet-out rollers 31 may extend from additional arms further along the base 352 (e.g., further into the page in FIG. 14) adjacent any additional modules extending from additional first arms.

A first pneumatic cylinder 380 is connected to the first arm 320A, and a second pneumatic cylinder 382 is connected to the second arm 320B. For example, the arms 320A, 320B may be telescoping arms and the pneumatic cylinders 380, 382 are represented as being disposed between upper and lower portions of the respective arms 320A, 320B. The pneumatic power source 44 shown in FIG. 1 is selectively connected to the first pneumatic cylinder 380 and to the second pneumatic cylinder 382 to extend and retract the first arm 320A and the second arm 320B separately from one another. For example, one or more valves may be disposed in the air lines extending from the pneumatic power source 44 through the robotic arm 22 to the arms 320A, 320B to allow or block flow to the arms 320A, 320B. In FIG. 14, during the pick-up mode, the first arm 320A is extended and the second arm 320B is retracted. A force within the first range of forces (represented by force F1) is applied to the emblem 36.

Figure 15:
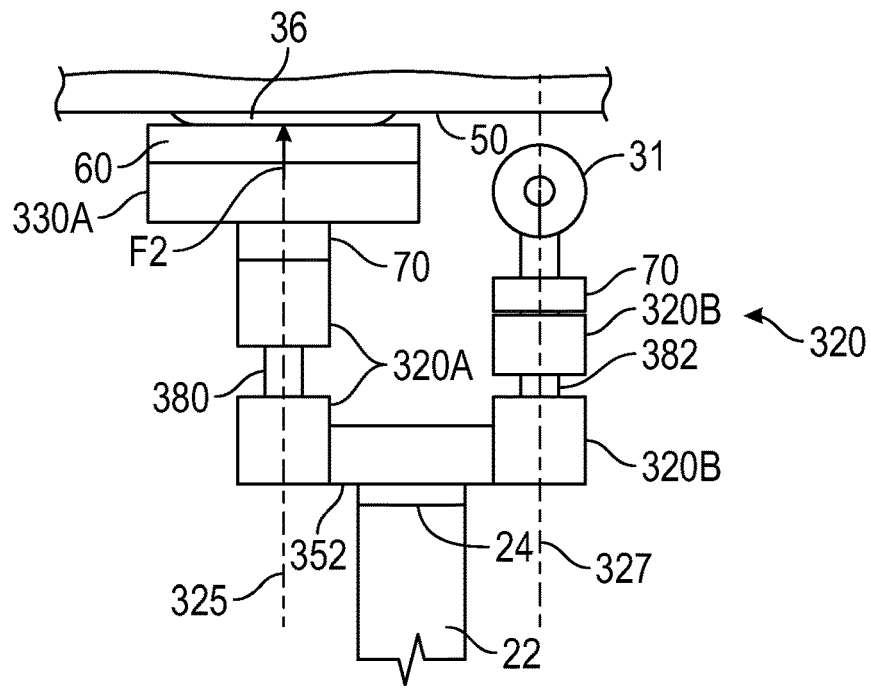
FIG. 15 is a side view of the end effector of FIG. 14 with the robotic arm rotated in a second orientation for placement of the emblem by one or more vacuum gripper modules on a vehicle body.

In FIG. 15, the robotic arm 22 is shown moved to a second orientation at the second location (the vehicle 12) to place the emblem 36 at the predetermined location 36A on the vehicle body 50. During the placement mode, the first arm 320A is extended and the second arm 320B remains retracted. A force within the second range of forces (represented by force F2) is applied to the emblem 36. A longitudinal axis 325 of the first arm 320A is parallel with a longitudinal axis 327 of the second arm 320B. Accordingly, after placement of an emblem 36, at the predetermined location 36A, the robotic arm 22 need only move in a direction parallel to the surface of the body 50, in addition to moving in the direction of arrow 14 as the vehicle moves with the tracks 16. However, the end effector 320 need not pivot as end effector 220 must. The movement path of the robotic arm 22 may thus be simpler to execute by the electronic controller 26.

Figure 16:
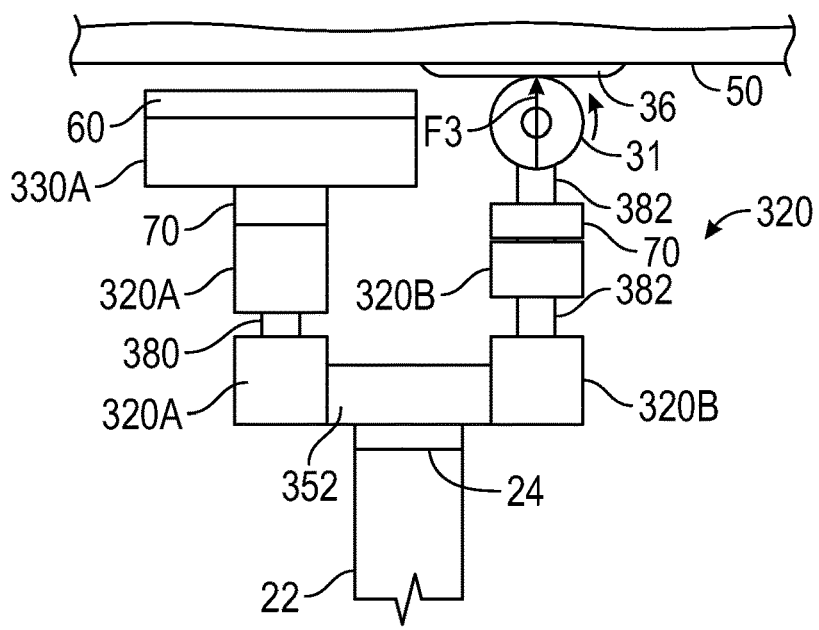
FIG. 16 is a side view of the end effector of FIG. 14 mounted on the robotic arm at the second location and showing the vacuum gripper module retracted and the wet-out roller extended for wet-out of the emblem on the vehicle body.

In FIG. 16, the vacuum gripper module 330A is retracted from the body 50 (by retracting the first arm 320A) and the wet-out roller 31 is extended (by extending the second arm 320B) for wet-out of the emblem 36 by the wet-out roller 31. For example, one or more switches within lines from the pneumatic power source 44 to the pneumatic cylinders 380, 382 may be controlled by the electronic controller 26 to quickly block air pressure to the first arm 320A and allow air pressure to the second arm 320B.

Figure 17:
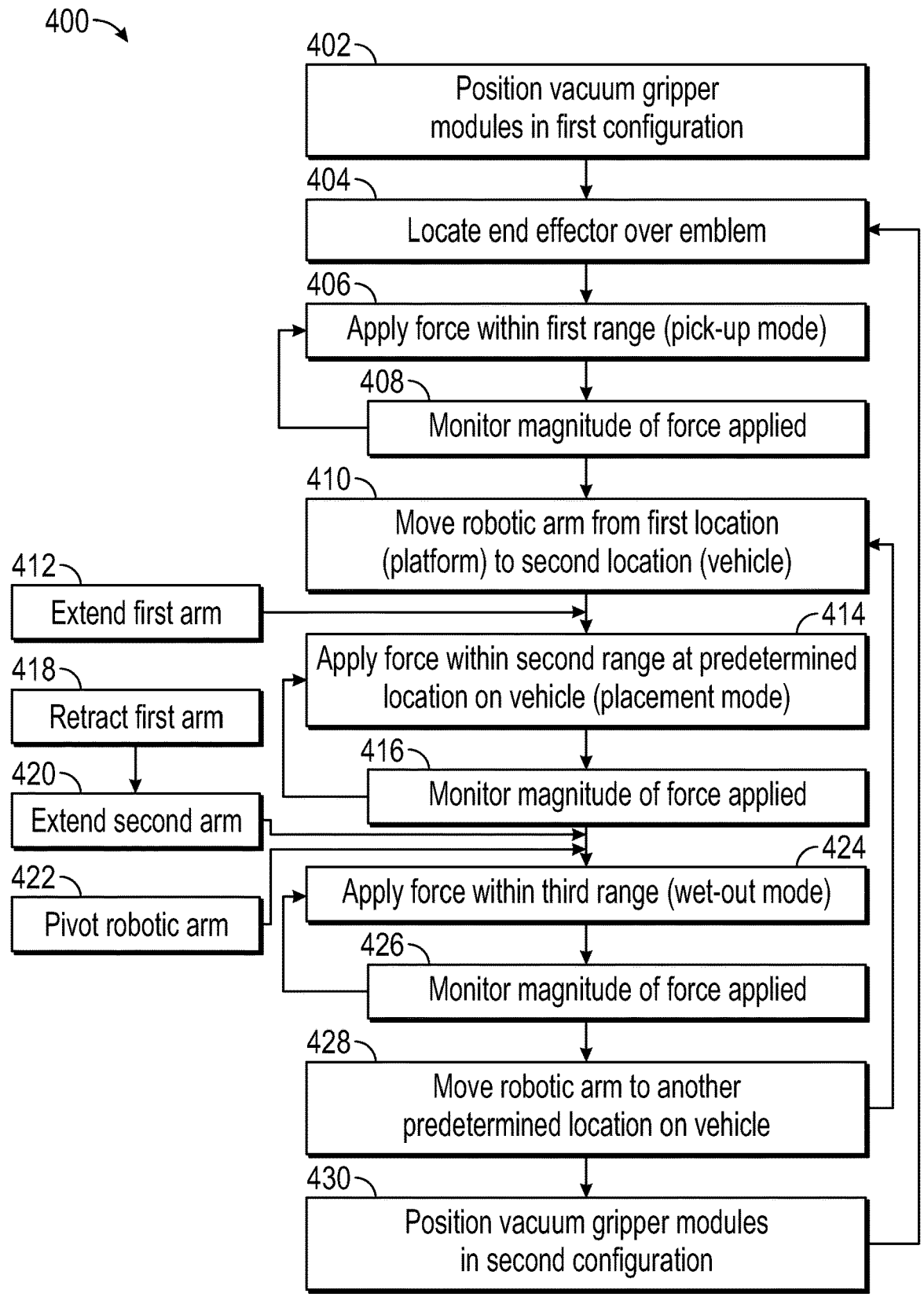
FIG. 17 is a flow chart of an emblem installation method.

Accordingly, a method 400 of emblem installation described herein is shown in FIG. 17. The method 400 may begin with step 402, positioning multiple vacuum gripper modules in a configuration corresponding to a dimension of a first emblem 32 and a dimension of a second emblem 34, and then step 404, locating the end effector to extend over one of the emblems 32 or 34 at a first location. For example, the emblems 32, 34 may be supported on the platform 40. Next, in step 406, a force F1 is applied within a first range of forces via one or more vacuum gripper modules 30A, 30B, 30C. Due to step 402, a first set 30A, 30B of the multiple vacuum gripper modules applies the force F1 within the first range of forces to the first emblem and not to the second emblem 34, and a second set 30C of the multiple vacuum gripper modules applies the force F1 within the first range of forces to the second emblem 34 and not to the first emblem 32. During step 406, the method 400 may include step 408, monitoring a magnitude of the force applied so that the force may be adjusted in step 406, if necessary, to maintain the force F1 applied within the first range of forces.

Next, the method proceeds to step 410, moving the robotic arm 22 from the first location (the emblem support platform 40) to the second location (adjacent the vehicle 12) while maintaining vacuum to those ones of the vacuum gripper modules that are gripping an emblem. Once the end effector 20 is positioned adjacent the vehicle body 50 via movement of the robotic arm 22 in step 410, any steps necessary prior to emblem placement are carried out. For example, in the embodiment of the end effector 320, this may include step 412, extending the first arm 320A, if not already extended to accomplish the pick-up mode. Next, in step 414, a force F2 within a second range of forces is applied via the one or more vacuum gripper modules to the emblem during the placement mode. During step 412, the method 400 may include step 414, monitoring a magnitude of the force applied so that the force F2 may be adjusted in step 412, if necessary, to maintain the force applied within the second range of forces.

After the placement mode of step 414, any steps necessary prior to emblem wet-out are carried out. For example, in the embodiment of the end effector 320, this may include step 418, retracting the first arm 320A and step 420, extending the second arm 320B. Alternatively, in the embodiment of the end effector 220, this may include step 422, pivoting the robotic arm about the axis 229 to move the wet-out roller 31 adjacent to the emblem on the vehicle body 50.

Next, in step 424, a force F3 is applied within a third range of forces via the wet-out roller 31 to the emblem during the wet-out mode. During step 424, the method 400 may include step 426, monitoring a magnitude of the force applied so that the force may be adjusted in step 424, if necessary, to maintain the force F3 applied within the third range of forces.

After step 424, the installation of the emblem to which force was applied in step 424 is complete. If any of the other vacuum gripper modules are still gripping other emblems that are ready to be installed on the vehicle body 50, the method 400 may include step 428, moving the robotic arm 22 to another predetermined location on the vehicle body 50, e.g., to the second predetermined location 34A, for example, to install the second emblem 34.

Once all of the emblems that were held by the vacuum gripper modules 30A, 30B, and/or 30C after the pick-up mode of step 404 have been placed installed, if still more emblems are to be installed on the vehicle 12, or if emblems of different lengths or other dimensions are to be installed on another vehicle, the method 400 may proceed to step 430, positioning the vacuum gripper modules in a second configuration, e.g., the configuration of FIG. 4, for example, to then return to step 404 and proceed through the method 400, installing emblems 36 and 38, for example.

Accordingly, several embodiments of end effectors disclosed herein allow efficient installation according to the method 400. The end effectors can carry multiple emblems from a pick-up location to a placement location at once, and can be reconfigured as necessary in correspondence with emblem sets of different dimensions, for example. The end effectors that have parallel arms supporting the vacuum gripper module(s) and the wet-out roller(s) enable easier robotic path control. The use of compliant members of different thickness and/or stiffnesses enables better conformance to the emblem and more uniform vacuum gripping over the emblem, and the use of force sensors enables adaptive force control to maintain forces appropriate for the different modes of the installation process (pick-up, placement, and wet-out) as well as to customized forces over different regions of the same emblem, for example.

While the best modes for carrying out the disclosure have been described in detail, those familiar with the art to which this disclosure relates will recognize various alternative designs and embodiments for practicing the disclosure within the scope of the appended claims.

What is claimed is:

1. An emblem installation system for installing emblems on a work piece, the emblem installation system comprising:
   an end effector for a robotic arm, the end effector having a base and multiple vacuum gripper modules repositionable along the base in different configurations, the multiple vacuum gripper modules configured to simultaneously grip multiple emblems and individually release the multiple emblems; wherein the end effector further includes a wet-out roller;
   one or more force sensors operatively connected to the multiple vacuum gripper modules and to the wet-out roller and operable to indicate an application force of each of the multiple vacuum gripper modules and of the wet-out roller; and
   an electronic controller in communication with the one or more force sensors and configured to execute a set of stored instructions to apply a force within a first range of forces to grip the multiple emblems with the multiple vacuum gripper modules, a force within a second range of forces to place the multiple emblems at different predetermined locations on the work piece, and a force within a third range of forces to apply the wet-out roller to the multiple emblems on the work piece.

2. The emblem installation system of claim 1, further comprising:
an emblem support platform having multiple through holes and configured to support the multiple emblems; and
wherein the multiple vacuum gripper modules extend directly over at least some of the multiple through holes when gripping the multiple emblems to pick the multiple emblems up off of the emblem support platform.

3. The emblem installation system of claim 1, wherein the base includes a track, and the multiple vacuum gripper modules are repositionable in the different configurations along the track.

4. The emblem installation system of claim 1, wherein:
each of the multiple vacuum gripper modules includes a compliant body configured to resiliently compress to conform to one of the multiple emblems; and
a compressive stiffness, a thickness, or both a compressive stiffness and a thickness of the compliant body of at least one of the multiple vacuum gripper modules is different than a compressive stiffness, a thickness, or both a compressive stiffness and a thickness of the compliant body of at least one other of the multiple vacuum gripper modules.

5. The emblem installation system of claim 1, wherein the end effector further includes, a first arm extending from the base to at least one of the multiple vacuum gripper modules, and a second arm extending from the base to the wet-out roller, a first pneumatic cylinder connected to the first arm, and a second pneumatic cylinder connected to the second arm; and the emblem installation system further comprising:
a pneumatic power source selectively connected to the first pneumatic cylinder and to the second pneumatic cylinder to extend and retract the first arm and the second arm separately from one another.

6. The emblem installation system of claim 5, wherein a longitudinal axis of the first arm is parallel with a longitudinal axis of the second arm.

7. The emblem installation system of claim 1, wherein:
the end effector further includes, a first arm extending from the base to at least one of the multiple vacuum gripper modules, and a second arm extending from the base to the wet-out roller; and
a longitudinal axis of the first arm is nonparallel with a longitudinal axis of the second arm.

8. An emblem installation method comprising:
applying a force within a first range of forces to multiple emblems individually and in succession via multiple vacuum gripper modules of an end effector on a robotic arm, the multiple emblems disposed at a first location;
monitoring, via one or more force sensors operatively connected to the multiple vacuum gripper modules and to a wet-out roller of the end effector, a magnitude of the force applied by the multiple vacuum gripper modules while applying the force within the first range of forces;
applying a vacuum to the multiple vacuum gripper modules to grip the multiple emblems simultaneously with the multiple vacuum gripper modules;
moving the robotic arm from the first location to a second location adjacent a workpiece while the multiple emblems are gripped by the multiple vacuum gripper modules to transfer the multiple emblems from the first location to the second location;
applying a force within a second range of forces to the multiple emblems via the multiple vacuum gripper modules while releasing the vacuum to the multiple vacuum gripper modules individually and in succession to place the multiple emblems at different predetermined locations on a work piece;
monitoring, via the one or more force sensors operatively connected to the multiple vacuum gripper modules and to the wet-out roller, a magnitude of the force applied by the multiple vacuum gripper modules while applying the force within the second range of forces;
applying a force within a third range of forces to the multiple emblems via the wet-out roller to wet-out the multiple emblems on the work piece after placing the multiple emblems at the different predetermined locations on the work piece;
monitoring, via the one or more force sensors operatively connected to the multiple vacuum gripper modules and to the wet-out roller, a magnitude of the force applied by the wet-out roller while applying the force within the third range of forces; and
wherein an electronic controller in communication with the one or more force sensors is configured to execute a set of stored instructions to apply the force within the first range of forces to grip the multiple emblems with the multiple vacuum gripper modules, the force within the second range of forces to place the multiple emblems at the different predetermined locations on the work piece, and the force within the third range of forces to apply the wet-out roller to the multiple emblems on the work piece.

9. The emblem installation method of claim 8, wherein the work piece is moving while applying the force within the second range of forces and the force within the third range of forces, and the method further comprising:
tracking movement of the work piece; and
moving the robotic arm in response to the movement of the work piece while applying the force within the second range of forces and the force within the third range of forces.

10. The emblem installation method of claim 8, wherein the end effector includes a first arm supporting at least one of the multiple vacuum gripper modules, a second arm supporting the wet-out roller, a longitudinal axis of the first arm parallel with a longitudinal axis of the second arm, and the emblem installation method further comprising:
extending the first arm prior to applying the force within the first range of forces; and
retracting the first arm and extending the second arm prior to applying the force within the third range of forces via the wet-out roller.

11. The emblem installation method of claim 8, wherein the end effector includes a first arm supporting at least one of the multiple vacuum gripper modules, a second arm supporting the wet-out roller, a longitudinal axis of the first arm nonparallel with a longitudinal axis of the second arm, and the emblem installation method further comprising:
pivoting the robotic arm about an axis perpendicular to both of the longitudinal axis of the first arm and the longitudinal axis of second arm after applying the force within the second range of forces via the at least one of the multiple vacuum gripper modules and before applying the force within the third range of forces via the wet-out roller.

12. The emblem installation method of claim 8, wherein the multiple emblems are supported on an emblem support platform having multiple through holes; and wherein applying the vacuum to the multiple vacuum gripper modules pulls air through the through holes to pick up the multiple emblems off of the emblem support platform.

13. The emblem installation method of claim 8, wherein the end effector has a base with a track, and the emblem installation method further comprising:

positioning the multiple vacuum gripper modules in a configuration corresponding to a dimension of a first emblem and a dimension of a second emblem such that a first subset of the multiple vacuum gripper modules applies the force within the first range of forces and the force within the second range of forces to the first emblem and not to the second emblem, and a second subset of the multiple vacuum gripper modules applies the force within the first range of forces and the force within the second range of forces to the second emblem and not to the first emblem.

14. The emblem installation method of claim 13, wherein the multiple emblems are a first set of multiple emblems and the configuration of the multiple vacuum gripper modules is a first configuration, and the emblem installation method further comprising:

positioning the multiple vacuum gripper modules in a second configuration corresponding to a dimension of a third emblem and a dimension of a fourth emblem, the dimension of at least one of the third emblem or the fourth emblem being different than the dimension of the first emblem or the dimension of the second emblem, the second configuration different than the first configuration, such that a third subset of the multiple vacuum gripper modules applies the force within the first range of forces and the force within the second range of forces to the third emblem and not to the fourth emblem, and a fourth subset of the multiple vacuum gripper modules applies the force within the first range of forces and the force within the second range of forces to the fourth emblem and not to the third emblem, and either the third subset is different than the first subset or the fourth subset is different than the second subset or both the third subset is different than the first subset and the fourth subset is different than the second subset.

\* \* \* \* \*